United States Patent [19]

White

[11] Patent Number: 5,174,497

[45] Date of Patent: Dec. 29, 1992

[54] CRYOGENIC PILOT VALVE

[75] Inventor: Norman H. White, East Amherst, N.Y.

[73] Assignee: Praxair Technology, Inc., Danbury, Conn.

[21] Appl. No.: 818,768

[22] Filed: Jan. 13, 1992

[51] Int. Cl.$^5$ .............................................. G05D 23/02
[52] U.S. Cl. .................................................... 236/102
[58] Field of Search ................................ 236/102, 87

[56] References Cited

U.S. PATENT DOCUMENTS

| | | | |
|---|---|---|---|
| 808,707 | 1/1906 | Wadsworth | 236/102 |
| 988,726 | 4/1911 | Mallory | 236/102 X |
| 1,694,492 | 12/1928 | Tabler | 236/102 X |
| 1,952,440 | 3/1934 | Kelley | 236/102 |
| 2,055,922 | 9/1936 | Brennen | 236/102 |
| 2,843,325 | 7/1958 | Greenwald et al. | 236/102 |
| 3,375,975 | 4/1968 | Smith et al. | 236/102 X |
| 3,650,505 | 3/1972 | Drexel | 251/11 |
| 3,782,681 | 1/1974 | Blackstein | 251/11 |
| 4,209,065 | 6/1980 | Ledent | 166/64 |
| 4,441,327 | 4/1984 | Klee et al. | 236/102 X |
| 4,451,002 | 5/1984 | Klee et al. | 236/101 R |
| 4,852,601 | 8/1989 | Chamberlin | 137/62 |
| 5,063,956 | 11/1991 | Borcuch et al. | 137/14 |

FOREIGN PATENT DOCUMENTS

| | | | |
|---|---|---|---|
| 681134 | 1/1929 | France | 236/102 |
| 628685 | 9/1949 | United Kingdom | 236/102 |

OTHER PUBLICATIONS

Miles, Thermostatic Control, George Newnes Ltd. 1975, pp. 5-9.

Primary Examiner—William E. Tapolcai
Attorney, Agent, or Firm—Stanley Ktorides

[57] ABSTRACT

A cryogenic pilot valve comprising a thermal sensing element of two disparate thermal expansion materials on an actuator body joined to a control fixture having an integral valve wherein the actuator body and the control fixture are rigidly joined by loaded threads which simultaneously serve as the calibration set point device.

4 Claims, 1 Drawing Sheet

CRYOGENIC PILOT VALVE

TECHNICAL FIELD

This invention relates generally to control valves and more particularly to control valves for controlling the flow of vapor generated from liquid such as cryogenic liquid.

BACKGROUND ART

Gases are employed in a wide variety of uses. Because of the very large volume difference between a fluid in its gaseous and liquid phases, the gas will often be stored at the use site in the liquid phase and vaporized into the gas phase as usage requirements dictate. This procedure is typically employed with cryogenic fluids which are in the gas phase at ambient conditions and are in the liquid phase at very low temperatures. Examples of such fluids include nitrogen, oxygen, argon, hydrogen and helium.

Such cryogenic fluids are stored at the use site in the liquid phase and vaporized to provide gaseous product for use. Typical examples include the vaporization of liquid oxygen for use at a medical facility and the vaporization of liquid nitrogen for use for blanketing or inerting purposes in a manufacturing process such as in the manufacture of integrated circuits or microchips. A typical installation includes a liquid storage tank and a vaporizer to vaporize the liquid. The vaporizer may be powered by any heat source such as electric heat, steam, hot water, and, in the case where the liquid is a cryogenic liquid, the heat in the ambient air. When an ambient air vaporizer is employed, a preferred such vaporizer is the wide space vaporizer disclosed and claimed in U.S. Pat. No. 4,399,660 Vogler, et al.

It is important that the vaporizer operate effectively because the delivery of non-vaporized fluid to the use point could be very harmful. Moreover, especially in the case of a cryogenic fluid, even if fully vaporized, the gas must be delivered to the use point at a sufficiently high temperature to avoid damage. This temperature is generally at least about −40° F.

The liquid storage tank-vaporizer assembly is expected to operate unattended, 24 hours a day, under all weather conditions. Thus, it is important that any temperature sensitive control valve that may be employed to guard against unacceptably low fluid temperature flow be resistant to exogenous set point upsets such as sudden and severe changes in ambient conditions.

Accordingly, it is an object of this invention to provide a pilot valve for affording low temperature protection in fluid flow while providing system integrity for protection against ambient upsets.

SUMMARY OF THE INVENTION

The above and other objects, which will become apparent to one skilled in the art upon a reading of this disclosure are attained by the present invention which is:

A cryogenic pilot valve having an actuator body and a controlled component holding fixture characterized by:

(A) said actuator body comprising:
(1) a metallic sensing tube having a free end; and
(2) a low thermal expansion element within the metallic sensing tube, attached by welding or brazing at one end to the free end of the sensing tube and having an actuator at the other end;

(B) said controlled component holding fixture comprising:
(3) loaded calibration threads for screwing the controlled component holding fixture into the actuator body to form a rigid joint;
(4) a valve seat having an aperture; and
(5) a spring loaded spherical valve plug for contacting the actuator through the valve seat aperture; and (C) inlet and outlet valve ports within the actuator body and controlled component holding fixture.

As used herein the term "thermal expansion" means an increase in length dimensions with an increase in temperature.

As used herein the term "belleville springs" means a concave shaped washer whose concave profile is flattened in proportion to an applied axial load.

DETAILED DESCRIPTION

The invention is an integrated device for low temperature protection comprising an improved mechanical arrangement which can achieve a stable and easily adjusted set point that is not affected by changes in ambient conditions and, integrated therewith, a valve which responds in a repeatable way to the small thermally induced changes within the rigid, high integrity mechanical arrangement.

Figure 1A:
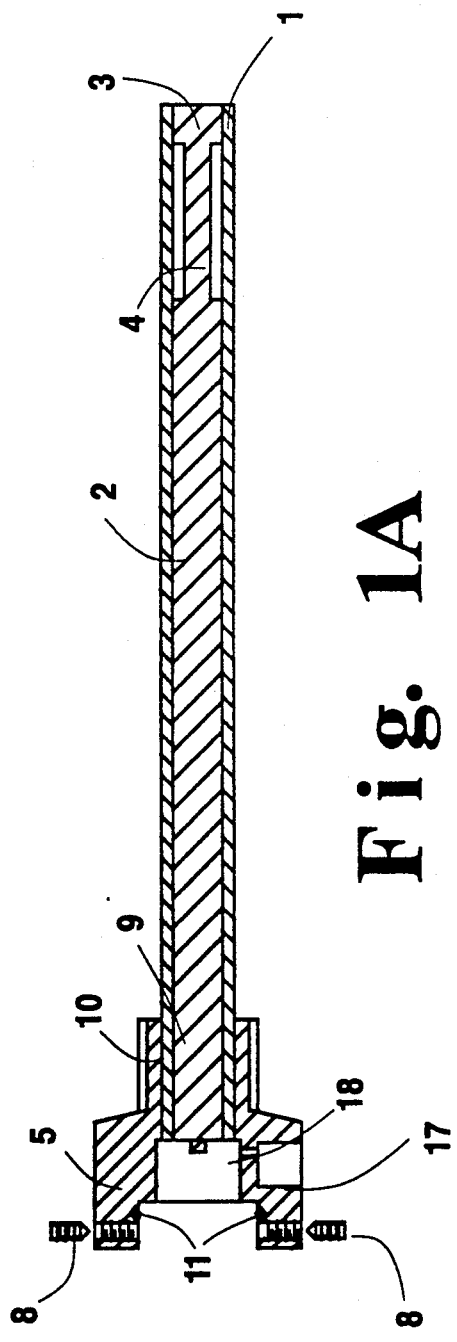
FIGS. 1A and 1B are both cross-sectional representations of one preferred embodiment of the invention showing respectively the actuator body and controlled component holding fixture of the invention unscrewed and separated for ease of description.
Figure 1B:
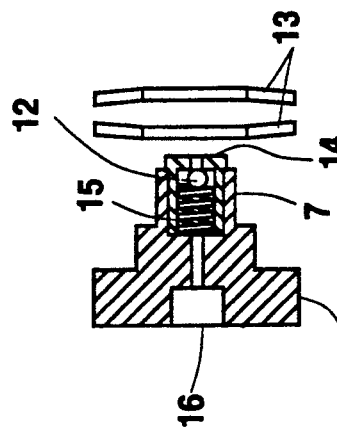

The invention will be described in detail with reference to the Figures. Referring now to FIGS. 1A and 1B, the cryogenic pilot valve of this invention comprises actuator body 5 and controlled component holding fixture 6 which are joined together to form the cryogenic pilot valve.

Actuator body 5 comprises metallic sensing tube 1 which may be made of any metal having a relatively high coefficient of thermal expansion such as steel, copper or a copper alloy. A particularly preferred metal for the sensing tube is red brass. The sensing tube is integrated with the actuator body 5 at 9 and has a free end 3. The sensing tube is exposed to the sensed temperature and the expansion or contraction of this tube in response to changes in sensed temperature is used to actuate the controlled component. The speed of response to changes in the sensed temperature is increased with the thinness of the sensing tube and with the thermal conductivity of the sensing tube material of construction.

Within metallic sensing tube 1 there is low thermal expansion element 2 which has a coefficient of thermal expansion less than that of the material from which sensing tube 1 is constructed. Preferably the coefficient of thermal expansion of element 2 is one-tenth or less, most prefably one-fifteenth or less of that of metallic sensing tube 1. A particularly preferred material for element 2 is Invar or an equivalent iron-nickel alloy comprised of about 36 percent nickel with small quantities of manganese, silicon and carbon amounting to a total of less than 1 percent with the balance being iron.

Invar or its equivalent is particularly preferred because its thermal expansion is only about one-eighteenth that of most metals. Low thermal expansion element 2 will be interchangebly described herein as invar element 2.

Invar element 2 is fixed to free end 3 of sensing tube 1 by welding or brazing and in the case of brazing the invar element 2 is radially spaced by space 4 from the inner surface of sensing tube 1 for a portion of its axial length. The clearance between invar element 2 and sensing tube 1 is minimized so that the maximum relative lateral motion between the invar element and the sensing tube at the free end cannot deform the fixed joint. The small clearance also increases the heat transfer rate between the sensing tube and the invar element and therefore speeds the secondary response which will be more fully described later. The clearance, however, must be large enough to allow free axial movement of the invar element over the expected temperature range. The clearance will typically be within the range of from 0.005 to 0.025 inch and preferably within the range of from 0.003 to 0.010 inch.

Actuator 18 is on the end of invar element 2 opposite from the end fixed to free end 3 of sensing tube 1. Actuator 18 may be of any shape suitable to conform to the controlled components.

The thermal expansion of invar element 2 is small but measurable and therefor the actuator goes through a two stage response to a temperature change. The first and primary response occurs due to the expansion or contraction of the sensing tube as it changes temperature. Later, when the invar element achieves the temperature of the sensing tube through heat transfer, an approximately ten times smaller movement occurs in the opposite direction due to the expansion of the invar. The total response of the actuator does not occur until the invar element also reaches the sensed temperature. For these reasons, the invar element may be hollow to minimize its mass and therefore the amount of heat to be transferred.

Actuator body 5 provides a connection to the piping system 10 through which the fluid to be controlled is flowing. The controlled component holding fixture 6 is joined to the actuator body 5 by a threaded connection which also serves as the calibration adjustment.

Both the actuator body and the controlled component holding fixture are exposed to the environment. When the ambient temperature surrounding the surfaces of these components is higher than that of the monitored fluid, heat will be convected from the environment to their surfaces and conducted through them to the sensing tube raising its temperature. Similarly, when the ambient temperature surrounding the surfaces of these components is lower than that of the monitored fluid, heat will be conducted through them to and from the sensing tube and will be convected to the environment from their surfaces lowering the sensing tube temperature. In either case, the sensing element will not reach the monitored fluid temperature and an error will be introduced. This is a particular problem where the ambient temperature and the wind speed are expected to vary over a wide range. To reduce such an error, the surface areas of the housings for actuator body 5 and fixture 6 are minimized and their material of construction selected for low thermal conductivity such as less than 30 BTU/HR-FT-° F. Suitable materials include copper nickel alloys and stainless steel.

The controlled component holding fixture 6 comprises loaded calibration threads 7 for screwing the controlled component holding fixture 6 into actuator body 5 to form a joint. Threads 7 simultaneously serve to calibrate the cryogenic pilot valve assembly of this invention. The aforesaid joint is loaded preferably with belleville springs 13 so that the loading of the threads throughout the calibration range is preferably within the range of from 20 to 75 percent of the yield stress. This level of loading results in an extremely rigid joint that is not subject to movement under conditions of mechanical shock, vibration and temperature extremes.

Belleville washers give the highest load per space of any ordinary spring type. Other springs such as coil springs, wave spring washers and finger spring washers could also be used but would require a greater profile in the pilot valve to achieve the same loading. Threads have considerable tolerance to allow free engagement of the parts. This allows measurable axial movement between the parts until the joint is tightened. In the tightening process, one face of each thread is loaded against the mating resulting in a stress. The joint will not move in the opposite direction to the preload until a load larger than the preload is applied. The spring serves to bottom the thread over a range resulting in a compact arrangement but still having a high load to take out play. The aforesaid joint is loaded with a spring producing a load of between 500 and 1000 pounds throughout the calibration range. This level of loading results in an extremely rigid joint.

Set screws 8 may additionally be employed to further secure the position of the controlled component holding fixture to the invar element. Pressure seal 11, comprised, for example, of viton, may also be provided between the well of actuator body 5 and controlled component holding fixture 6.

As mentioned the assembly of this invention includes an integral valve. The valve comprises a valve body which is machined into controlled component holding fixture 6 thus eliminating any relative motion between the valve and the fixture.

The valve comprises a valve seat 14 preferably made of metal although plastic may also be used. The valve seat is positioned between the invar element and the valve plug and has an aperture through which actuator 18 contacts the valve plug.

Valve plug 12 is spherical, e.g. a ball. The use of a ball for the valve plug eliminates the possibility of misalignment between the invar element and the plug. This shape for the valve plug results in a large opening with a small travel and is thus well suited for use with a low thermal expansion or invar element actuator.

Loading spring 15 serves to improve the sealing and the stability of the plug when the valve is open. Valve inlet Port 16 is provided in the controlled component holding fixture and valve outlet port 17 is provided in the actuator body.

Figure 2:
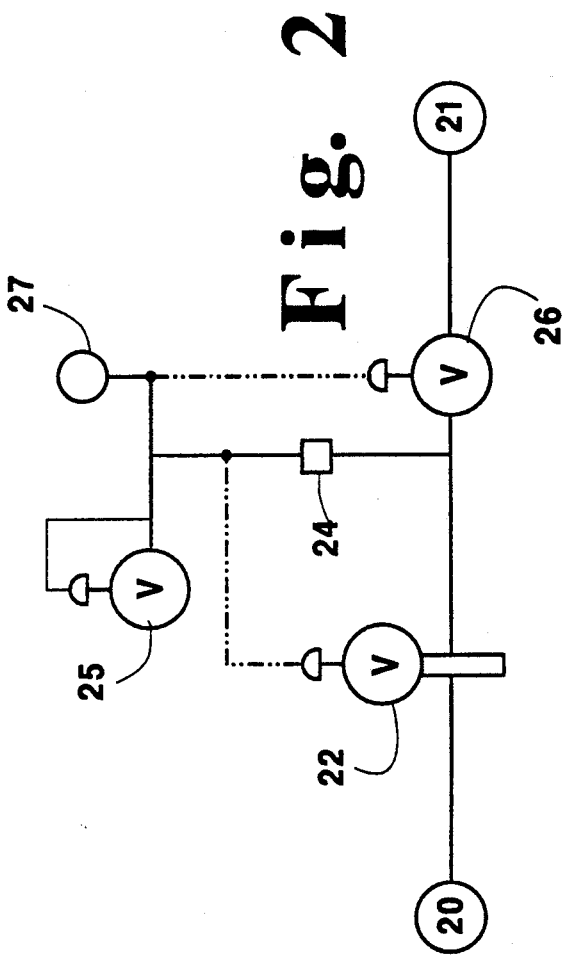
FIG. 2 is a simplified schematic representation of one embodiment of a control circuit employing the cryogenic pilot valve of this invention.

FIG. 2 illustrates one control scheme using the cryogenic pilot valve of this invention. In operation, with the temperature of the monitored fluid flowing from a vaporizer at 20 to a use point at 21 at an acceptably high level, the cryogenic pilot valve 22 is closed and the rest of the circuit maintains the stream pressure at 27 through a small continuous flow through the orifice 24 which leaks through back pressure valve 25 maintaining valve 26 open. In the event the temperature of the monitored fluid begins to drop to unacceptable levels, the cryogenic pilot valve will open. In this process, both the sensing tube and the invar element approach the fluid temperature. The length of the sensing tube is reduced by a greater amount than that of the invar element due to the difference in their coefficients of thermal expansion. Due to the mechanical arrangement, the tip 18 of the invar element advances until it makes contact with the spherical plug 12 and lifts it from the seat. This results in an open passage between 16 and 17. With pilot valve 22 open, gas passing through orifice 24 starts to vent through pilot valve 22 reducing the pressure at 27 and on the dome of flow control valve 26 causing it to close. This reduces the flow and enables the vaporizer to adequately heat the fluid. As the temperature of the monitored fluid increases, the opposite mechanism takes place and the fluid flowrate increases. With the integration of the valve with the temperature sensing element coupled with the rigid joint, exogenous upsets will not adversely affect the valve set point calibration ensuring the integrity of the control scheme.

Although the invention has been described in detail with reference to a certain particularly preferred embodiment, those skilled in the art will recognize that there are other embodiments of the invention within the spirit and scope of the claims.

I claim:

1. A cryogenic pilot valve having an actuator body and a controlled component holding fixture characterized by:

(A) said actuator body comprising:

(1) a metallic sensing tube having a free end; and (2) a low thermal expansion element within the metallic sensing tube, attached by welding or brazing at one end to the free end of the sensing tube and having an actuator at the other end;

(B) said controlled component holding fixture comprising:

(3) loaded calibration threads for screwing the controlled component holding fixture into the actuator body to form a rigid joint, said calibration threads loaded by at least one concave shaped washer whose concave profile is flattened in proportion to an applied axial load;

(4) a valve seat having an aperture; and (5) a spring loaded spherical valve plug for contacting the actuator through the valve seat aperture; and (C) inlet and outlet valve ports within the actuator body and controlled component holding fixture.

2. The cryogenic pilot valve of claim 1 wherein the low thermal expansion element comprises a nickel iron alloy containing about 36 percent nickel.

3. The cryogenic pilot valve of claim 1 wherein the low thermal expansion element has a coefficient of thermal expansion one-tenth or less of that of the metallic sensing tube.

4. The cryogenic pilot valve of claim 1 wherein the low thermal expansion element is radially spaced from the sensing tube for a portion of its length.

* * * * *